(12) United States Patent
Hehl

(10) Patent No.: US 6,666,674 B1
(45) Date of Patent: Dec. 23, 2003

(54) INJECTION MOULDING MACHINE WITH A MACHINE BASE

(76) Inventor: Karl Hehl, Arthur-Hehl-Strasse 32, D-72290 Lossburg (DE)

(*) Notice: Subject to any disclaimer, the term of this patent is extended or adjusted under 35 U.S.C. 154(b) by 50 days.

(21) Appl. No.: 10/110,561
(22) PCT Filed: Oct. 11, 2000
(86) PCT No.: PCT/EP00/09979
  § 371 (c)(1), (2), (4) Date: Apr. 12, 2002
(87) PCT Pub. No.: WO01/28749
  PCT Pub. Date: Apr. 26, 2001

(30) Foreign Application Priority Data
Oct. 16, 1999 (DE) .......................... 199 49 959

(51) Int. Cl.⁷ ............................................. B29C 45/17
(52) U.S. Cl. ................... 425/190; 425/192 R; 425/589
(58) Field of Search ............................. 425/190, 192 R, 425/589, 595

(56) References Cited

U.S. PATENT DOCUMENTS

| 2,438,856 A |   | 3/1948  | Knowles |            |
|-------------|---|---------|---------|------------|
| 3,852,010 A | * | 12/1974 | Hehl    | 425/192 R  |
| 6,155,811 A | * | 12/2000 | Looije et al. | 425/190 |

FOREIGN PATENT DOCUMENTS

| DE | 32 38 185 | 6/1983  |
|----|-----------|---------|
| DE | 381 273   | 9/1986  |
| DE | 92 10 274 | 9/1992  |
| JP | 05 237875 | 9/1993  |
| JP | 06 344372 | 12/1994 |

* cited by examiner

Primary Examiner—James P. Mackey
(74) Attorney, Agent, or Firm—Cantor Colburn LLP

(57) ABSTRACT

An injection molding machine is provided with a multi-piece machine base comprising at least two adjacently positioned components. A stationary mold carrier can be fixed to the one component of the machine base. To obtain an easy assembling which meets the demands during production, the components of the machine base can be connected underneath and in the vertical projection of the stationary mold carrier independently from each other.

9 Claims, 3 Drawing Sheets

INJECTION MOULDING MACHINE WITH A MACHINE BASE

BACKGROUND OF THE INVENTION

1. Field of the Invention

The invention relates to an injection molding machine for processing plastic materials and other plasticisable substances.

2. Description of Related Art

An injection molding machine of this type is known, for example, from the Arburg Selecta range. Various components of the machine stand are disposed beneath the mold closing unit and injection molding unit and are interconnected, for example, for the operation of the machine. When the machine is being set up, however, the two components of the machine base have to be leveled independently of one another, resulting in certain assembly expenditure. If the appropriate adjustments are not made, irregularities can be produced when the injection molding machine is being operated and these have a negative influence on the quality of the injection molded parts.

AT 381 273 B makes known a machine stand, molded and welded from steel plate blanks. A machine base of this type is certainly a match for stability requirements, however, processing problems arise as the machine increases in size as the machining centers are associated with specific sizes. Consequently, it is true that adjustment of various components is not necessary with this type of machine base, however, from a certain size, it is not possible to produce a machine base purely in this way.

BRIEF SUMMARY OF THE INVENTION

Proceeding from this state of the art, the object of the present invention is to provide an injection molding machine of the above-mentioned type with a machine base, which is easy to set up and nevertheless fulfils the requirements which exist when the injection molding machine is being operated.

This object is achieved through an injection molding machine for the processing of plastics materials and plasticisable substances, comprising:

a machine base which, with the machine in the operating condition, has adjacently positioned first and second components;

an injection molding unit for the plastification and injection molding of the plasticisable substances, which is disposed above the first component of the machine base;

a mold closing unit, which is disposed on the second component of the machine base;

a movable mold carrier and a stationary mole carrier having a mold clamping area therebetween; and an injection mold accommodated in the mold clamping area, the stationary mold carrier being securable to the second component of the machine base, wherein the first and second components of the machine base underneath and in a vertical projection of at least a foot of the stationary mold carrier is connectable to the foot independently of one another.

The machine base has several components, which can be connected to this latter underneath the stationary mold carrier independently of one another. In this way, the stationary mold carrier provides the point around which the machine base is to be leveled. The division is especially advantageous in the case of larger machines as a decision for a larger or smaller joint foot can be made at a later time during production, above all with regard to the injection molding unit. The machine base can be adapted to the precise requirements of the customer in each case, something which is also visible in the costs of the machine overall. Nevertheless, forces can be introduced in a reliable manner to where they are required, namely in the transition region between stationary mold carrier and injection molding machine.

BRIEF DESCRIPTION OF THE DRAWINGS

The invention is explained in more detail below by way of an exemplified embodiment. In which.

DETAILED DESCRIPTION OF THE INVENTION

The invention will now be explained in more detail as an example with reference to the enclosed drawings. The exemplified embodiments are only certainly to be seen as examples and are not to limit the inventive concept to one specific arrangement.

Figure 1:
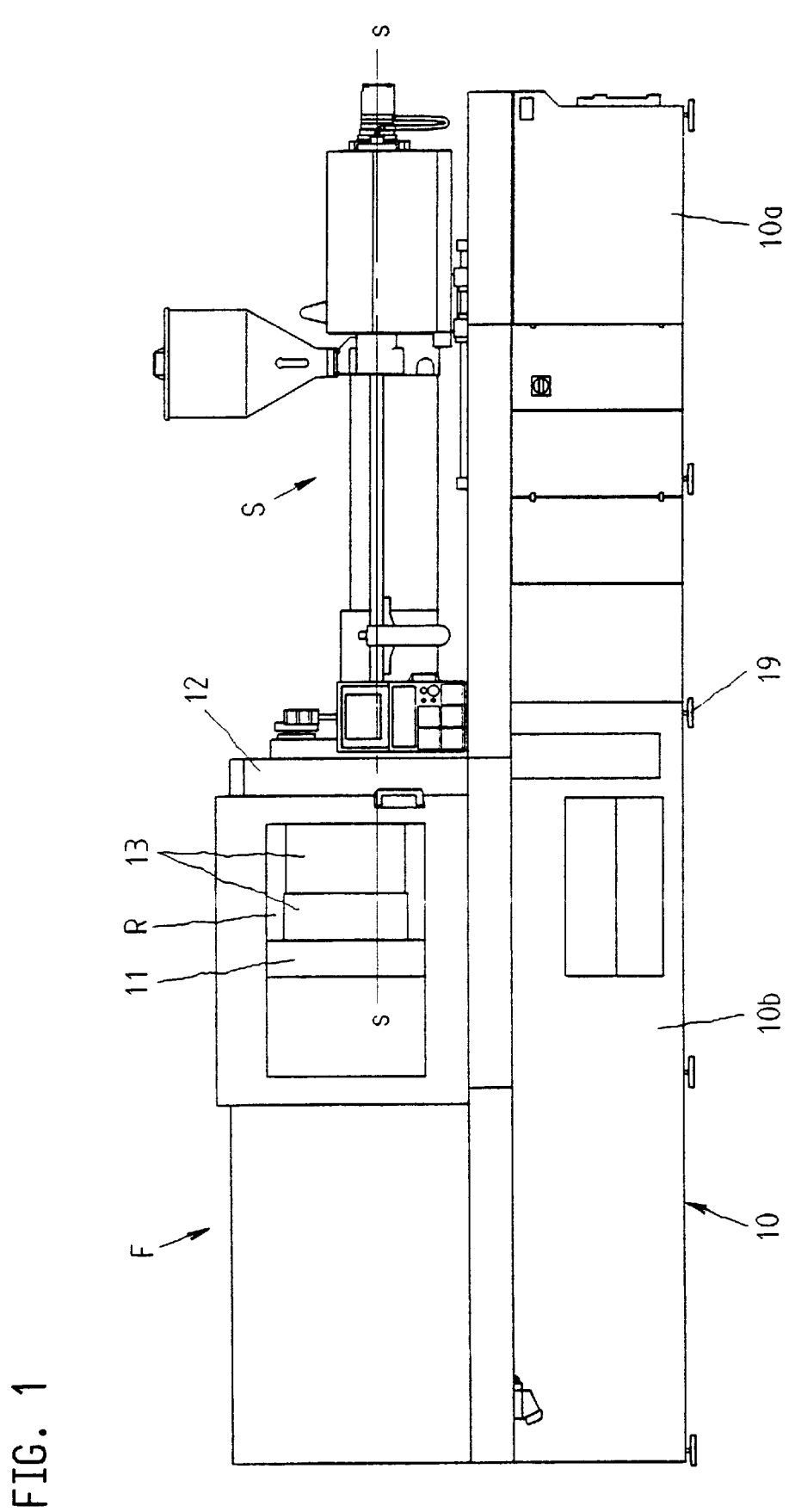
FIG. 1 is a front view of the injection molding machine.

FIG. 1 shows a front view of an injection molding machine for the processing of plastics materials and other plasticisable substances, such as, for example, ceramic or powdery substances. In the standard design, the injection molding machine has a mold closing unit F and an injection molding unit S on a machine base 10. The plasticisable substances are plasticised in the injection molding machine S and are then injected into a central mold cavity of an injection mold 13. This injection mold is accommodated in a mold clamping area R between a movable mold carrier 11 and a stationary mold carrier 12. The plasticisable substances are plasticised and injected along the axis of injection s-s of the injection molding unit S.

Figure 2:
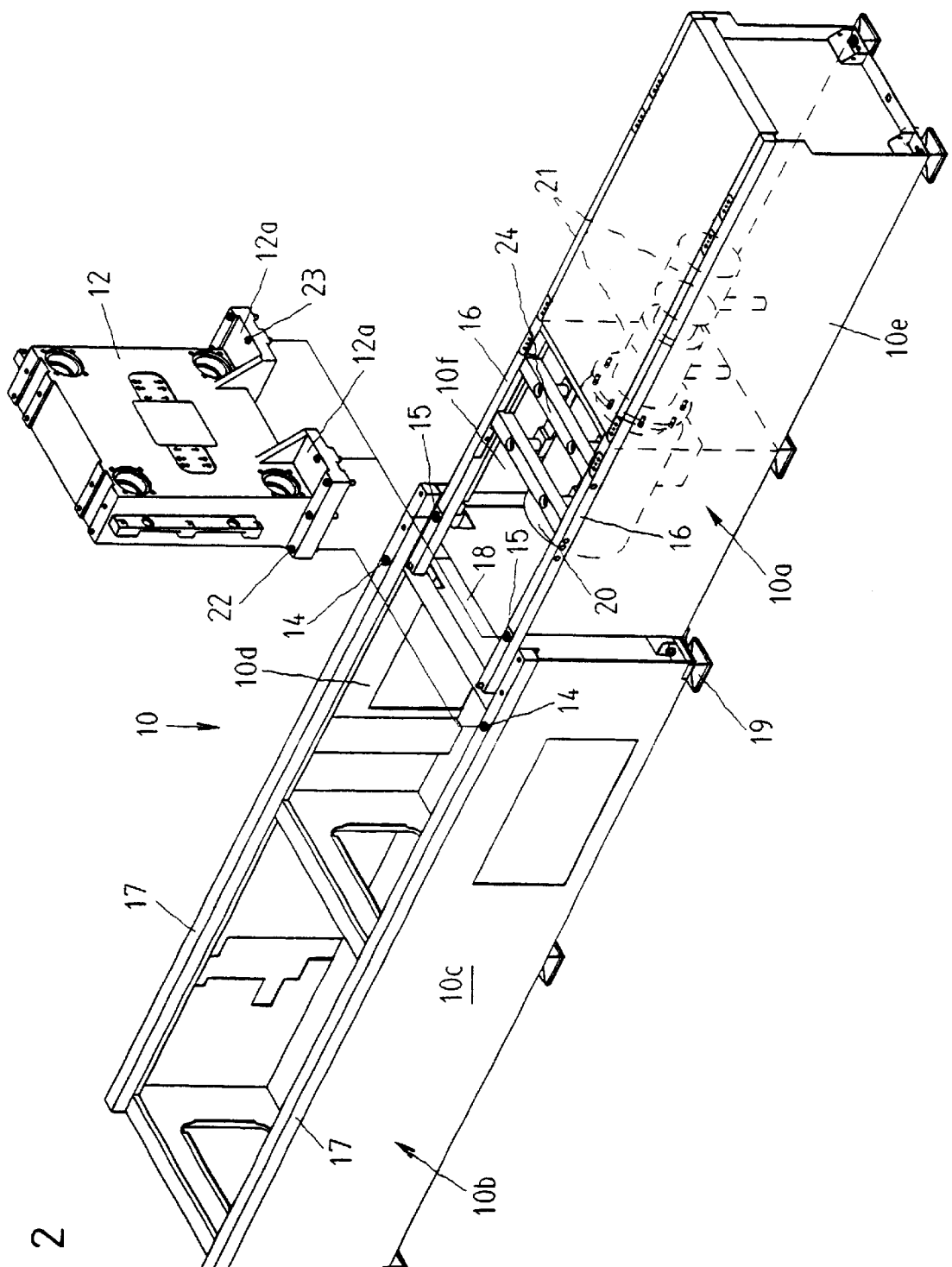
FIG. 2 is the components of the machine base with the stationary mold carrier removed to make the interfaces visible.

The machine base 10, in the operating condition, has at least two adjacently positioned components 10a, 10b. The injection molding unit is disposed above the one component 10a, whilst the mold closing unit is disposed above the other component 10b. In the exemplified embodiment, the stationary mold carrier 12 can be mounted on the other component 10b of the machine base. As can be seen in FIG. 2, the components 10a, 10b of the machine base 10, underneath and in the vertical projection of at least the foot 12a of the stationary mold carrier 12, can be connected to the latter independently of one another. This means that the components can be produced separately and interconnected during assembly. This connection does not have to be made until later on in the production process, so that the components can be prefabricated, but, nevertheless, the one component 10a of the machine base on the injection molding side, in particular, can be adapted to the respective requirements of the customer. As the size of the injection molding unit is strongly dependent on which material is being processed and which components have to be produced, its size can vary greatly. The machine base can easily be adapted to this— even for cost reasons. Through the connection made in the transition region between the two components 10a, 10b of the machine base 10, via the stationary mold carrier, which itself is configured relatively rigidly, a so-called fulcrum is created, around which the components of the machine base can be aligned substantially independently of one another.

Figure 3:
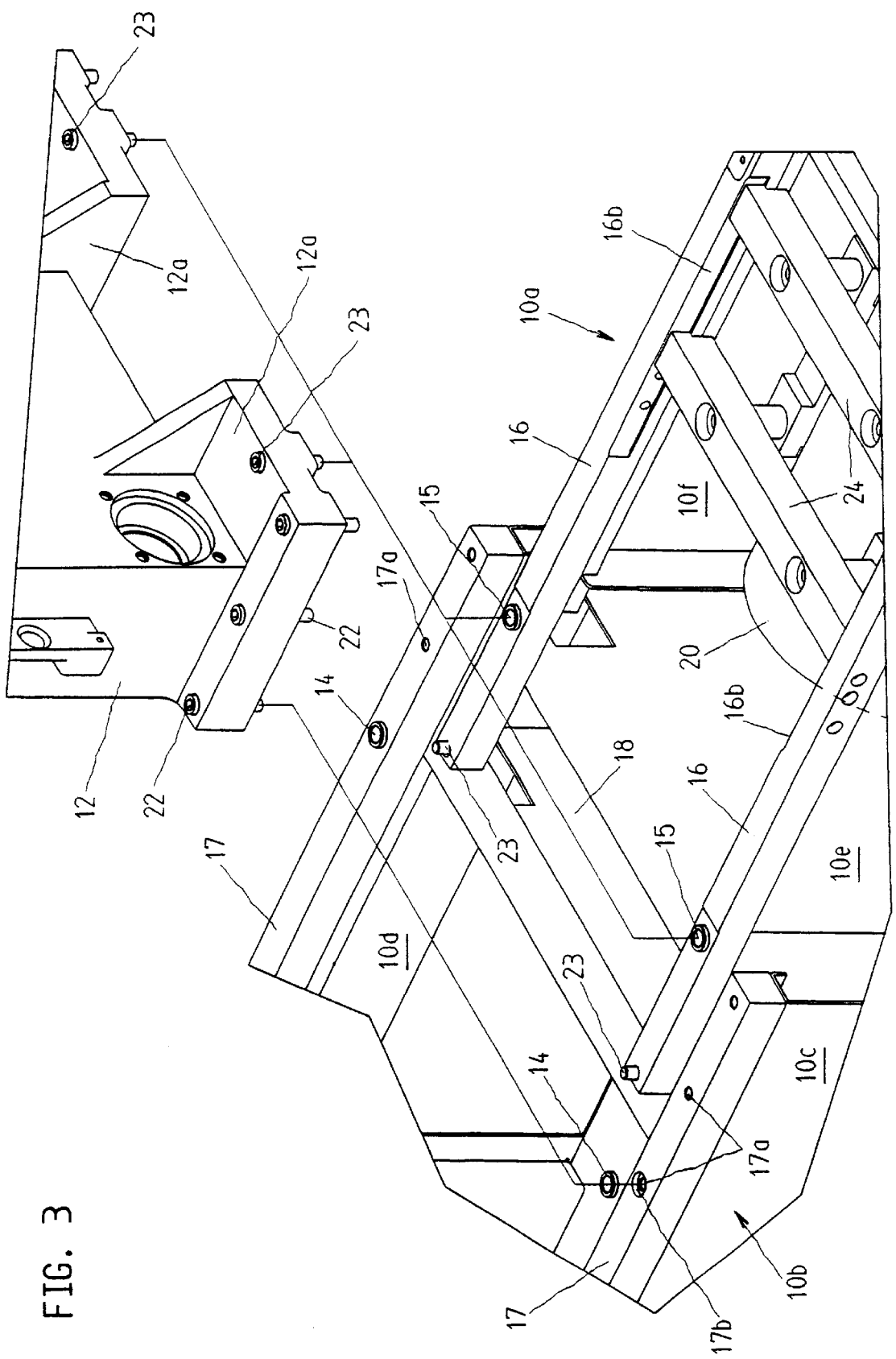
FIG. 3 is an enlarged section from FIG. 2.

The connection between the one component 10a on the injection molding side and the other component 10b of the machine base on the mold closing side, is effected in each case preferably via two centering elements 14, 15, which are disposed transversely relative to the axis of injection s-s. A restriction to only two centering elements in each case has the advantage that two points determine one straight line, which means that, in conjunction with the stationary mold carrier, consequently, there is a "pivotal axis" for the easier leveling of the two machine bases relative one to the other. FIG. 3 shows that the centering elements 14, for the other component 10b of the machine base with the stationary mold carrier via the fastening means 22, and the fastening means 15, for the one component 10a of the machine base with the stationary mold carrier 12 through the intermediary of the fastening means 23, are each disposed parallel relative to each other. In addition, the straight lines, formed by the centering elements 14, 15, are transverse, preferably at right angles to a vertical plane formed by the axis of injection s-s.

The manufacturer ensures that leveling around the axes thus formed is easy. The centering elements 14, 15 themselves are substantially above the longitudinal walls 10c, 10d of the other component 10b, which longitudinal walls are at a spacing from one another, or respectively above the longitudinal walls 10e, 10f of the one component 10a of the machine base 10. The actual "connecting means" is consequently the stationary mold carrier 12, it only having to be ensured that the two components 10a, 10b of the machine base terminate, or respectively lie, at least within the vertical projection of the foot, or respectively of the feet 12a of the stationary mold carrier 12.

As can be seen in FIGS. 2 and 3, the one component 10a supporting the injection molding unit S is narrower than the other component 10b supporting the mold closing unit F. Bearing bars 16, 17 are provided on the two components 10a, 10b of the machine base for the mounting of injection molding unit S and mold closing unit F. Obviously other bearing bars can also be disposed at suitable positions for the purposes described below. As shown in FIG. 3, the bearing bars 16 of the one component 10a protrude over this component in the direction of the other component 10b. The bearing bars 16 of the one component 10a, in the operating condition, come to lie between the bearing bars 17 of the other component 10b in a receiving area 18. As can be seen in FIGS. 1 and 2, the one component 10a is connected with the other component 10b indirectly via the stationary mold carrier 12 in such a manner that the two components are mutually supported in the region of the stationary mold carrier 12 on the feet 19 of the other component 10b.

The assembly is preferably effected in such a manner that initially one component of the machine base is lined-up and is then connected to the stationary mold carrier 12. The other component of the machine base is then mounted in this assembly unit, which has, consequently, been preliminarily lined up, such that this other component is easily lined up. Therefore, initially the other component 10b of the machine base is set up, aligned or respectively leveled. The stationary mold carrier 12 is then attached to this component. This attachment is effected by the stationary mold carrier 12 being placed with its feet 12a onto the bearing bars 17. At the same time the connection is made by the fastening means 22 under intermediate action of the centering means. When the centering means are defined in respect of their position, the remaining fastening means 22 are fixed in the bores 17a. The assembly unit, created in this way, is consequently set up with regard to the other component 10b of the machine base. At the same time, between the stationary mold carrier 12 and the other component 10b, an accepting area 18 is formed, into which the bearing bars 16 of the one component 10a of the machine base can be inserted. In order to obtain the connection at the desired position, the bearing bars 16 also have receiving areas, which engage in recesses (not shown in the drawing) in the feet 12a of the stationary mold carrier 12, for example with the fastening means 23. The one component 10a of the machine base is secured to the stationary mold carrier 12 via the centering elements 15 in connection with the fastening means 23. The disposition on the stationary mold carrier initially produces a rough arrangement of the one component 10a, as now that the continued movement is effected around the axis formed by the centering elements 15, the machine base can be easily leveled and adjusted. The centering elements, which are disposed preferably beneath the stationary mold carrier 12 in pairs in a parallel manner and transversely relative to the machine base, lead in this way to clear axes of displacement, thereby making any further leveling of the machine base only necessary in the third dimension. The injection molding unit is then built-on until the picture is as in FIG. 1.

As the over-all length of the one component 10a of the machine base varies depending on the customer's requirements, the center of gravity of the machine also changes in dependence on this machine base. At the same time, the mold closing unit is relatively heavy when compared with the injection molding unit. Consequently, the drive motor 20 and preferably also the pump units 21, driven by the drive motor, of the mold closing unit F and also of the injection molding unit S, are disposed beneath the injection molding unit in the one component 10a of the machine base and are consequently displaced under the injection molding unit, which moans that the center of gravity is as central as possible. The drive motor 20 is suspended between the bearing bars 16 to simplify assembly. This is effected, as can be seen in FIG. 3, by the bearing bars 16 having recesses 16b, in which retaining members 24 are suspended. The drive motor 20 is suspended on those retaining members. FIG. 3 shows that the recesses 16b are longer than the distance between the two retaining members 24. This makes it possible to hold this part of the bearing bars 16 forward in a standard manner and, where required, to displace the drive motor 20 in the direction of the axis of injection to adjust the center of gravity.

In principle, the two components of the machine base are interconnected indirectly via the stationary mold carrier 12 via their bearing bars only in the region of the stationary mold carrier 12. To convert the unit, for which the aforementioned center of gravity is decisive, it is consequently necessary to create further connections between the two components 10a, 10b of the machine base. Nevertheless, the unit, created in this way, can then be moved as a whole by the customer.

It is obvious that this description can be subject to the most varying modifications, changes and adaptations, which vary in the region of equivalents to the attached claims.

What is claimed is:

1. Injection molding machine for the processing of plastics materials and plasticisable substances, comprising:
   a machine base which, with the machine in an operating condition, has adjacently positioned first and second components;
   an injection molding unit for the plastification and injection molding of the plasticisable substances, which is disposed above the first component of the machine base;

a mold closing unit, which is disposed on the second component of the machine base;

mold carriers comprising a stationary mold carrier, the mold carriers having a mold clamping area therebetween; and an injection mold accommodated in the mold clamping area, the stationary mold carrier being securable to the second component of the machine base, wherein the first and second components of the machine base underneath and in a vertical projection of at least a foot of the stationary mold carrier are connectable to the foot independently of one another.

2. Injection molding machine according to claim 1, further comprising first and second centering members disposed in pairs parallel relative to one another and connecting the first and second components of the machine base and the stationary mold carrier.

3. Injection molding machine according to claim 2, wherein the first and second centering members are disposed transversely relative to an axis of injection, are allocated to each of the first and second components of the machine base, and are provided substantially above longitudinal walls of the components of the machine base, the walls spaced from one another.

4. Injection molding machine according to claim 1, wherein the first component of the machine base supporting the injection molding unit is narrower in comparison with the second component supporting the mold closing unit and is supported on the second component above the stationary mold carrier via first bearing bars, which project the first component in the direction of the second component.

5. Injection molding machine according to claim 4, wherein, in the operating condition, the first bearing bars of the first component come to rest between the second bearing bars of the second component.

6. Injection molding machine according to claim 1, wherein the second component of the machine base is connectable to the stationary mold carrier to form one assembly unit, a receiving area for introduction of the first component being formed between the stationary mold carrier and the second component.

7. Injection molding machine according to claim 1, wherein the first and second components of the machine base are supported in a transition region on common feet of the second component of the machine base.

8. Injection molding machine according to claim 1, further comprising a drive motor of mold closing unit and injection molding unit underneath the injection molding unit in the first component of the machine base.

9. Injection molding machine according to claim 8, wherein the drive motor is suspended between bearing bars of the first component.

* * * * *